United States Patent [19]

Schwärzler et al.

[11] Patent Number: 5,507,693

[45] Date of Patent: Apr. 16, 1996

[54] CONSTANT VELOCITY UNIVERSAL JOINT

[75] Inventors: Peter Schwärzler, Glattbach; Volker Bergmann, Stockstadt; Dieter Burghardt, Wiesbaden-Biebrich; Norbert Hofmann, Rodgau; Michael Ricks, Bad Vilbel; Hans-Heinrich Welschof, Rodenbach, all of Germany

[73] Assignee: Lohr & Bromkamp GmbH, Offenbach/Main, Germany

[21] Appl. No.: 91,235

[22] Filed: Jul. 13, 1993

[30] Foreign Application Priority Data

Jul. 14, 1992 [DE] Germany .................. 92 09 386.8
Sep. 1, 1992 [DE] Germany .................. 42 28 503.8

[51] Int. Cl.⁶ .................................................. F16D 3/205
[52] U.S. Cl. ...................... 464/111; 464/124; 464/132; 464/905
[58] Field of Search .................... 464/111, 112, 464/120, 123, 124, 905, 132

[56] References Cited

U.S. PATENT DOCUMENTS

| 4,379,706 | 4/1983 | Otsuka et al. ............... 464/124 |
| 4,589,856 | 5/1986 | Mazziotti et al. . |
| 5,171,185 | 12/1992 | Schneider ................... 464/905 |
| 5,209,700 | 5/1993 | Bensinger et al. ........... 464/905 |
| 5,330,389 | 7/1994 | Jost et al. .................. 464/905 |
| 5,362,275 | 11/1994 | Girguis ...................... 464/111 |

FOREIGN PATENT DOCUMENTS

| 426186A1 | 5/1991 | European Pat. Off. . |
| 0426186 | 5/1991 | European Pat. Off. . |
| 0441382 | 8/1991 | European Pat. Off. . |
| 298249 | 6/1992 | European Pat. Off. . |
| 0532992A3 | 3/1993 | European Pat. Off. . |
| 2622264 | 4/1989 | France . |
| 2831044A1 | 12/1979 | Germany . |
| 3103172A1 | 12/1981 | Germany . |
| 3716962C2 | 5/1989 | Germany . |
| 2070195 | 9/1981 | United Kingdom . |
| 9006451 | 6/1990 | WIPO . |
| WO9308409 | 4/1993 | WIPO . |

*Primary Examiner*—Daniel P. Stodola
*Assistant Examiner*—Eileen A. Dunn
*Attorney, Agent, or Firm*—Harness, Dickey & Pierce

[57] ABSTRACT

A constant velocity universal joint of the tripod type has an outer joint part with three axially extending, circumferentially distributed longitudinal recesses with circumferentially distributed opposed tracks. The tracks have surfaces which are grooved so as to have the shape of a circular cylindrical portion. An inner joint part includes three radial circumferentially distributed arms each engaging one of the longitudinal recesses and carrying roller assemblies having roller carriers and roller elements. The roller elements have running faces in the shape of a spherical portion and are axially guided so as to roll on the tracks in the longitudinal recesses of the outer joint part. The roller carriers are guided on the arms so as to be pivotable and longitudinally movable relative to the respective arm axis. The roller elements are coaxially supported on the roller carriers so as to be rotatable, with the roller assemblies consisting of the roller carriers and roller elements, to prevent them from tilting relative to the outer joint part, are supported on the base of the recesses and on longitudinally extending guiding shoulder faces of the outer joint part which radially inwardly adjoin the tracks, with the roller elements, on their respective radial insides, each including an annular shoulder face which adjoins the running face in the shape of a spherical portion and which provides the supporting contact between the respective roller assembly and the guiding shoulder faces.

11 Claims, 5 Drawing Sheets

CONSTANT VELOCITY UNIVERSAL JOINT

BACKGROUND OF THE INVENTION

The present invention relates to a constant velocity universal joint of the tripod type having an outer joint part with three axially extending, circumferentially distributed longitudinal recesses with two circumferentially opposed tracks each. The tracks have surfaces which are grooved so as to have the shape of a circular cylindrical portion. An inner joint part includes three radial circumferentially distributed arms each engaging one of the longitudinal recesses and carrying roller assemblies with roller carriers and roller elements. The roller elements have running faces in the shape of a spherical portion and which are axially guided so as to roll on the tracks in the longitudinal recesses of the outer joint part. The roller carriers are guided on the arms so as to be pivotable and longitudinally movable relative to the respective arm axis. The roller elements are coaxially supported on the roller carriers so as to be rotatable optionally by roller or needle bearings. The roller assemblies, which include the roller carriers and roller elements, prevent the assemblies from tilting relative to the outer joint part, and are supported on the base of the recesses and on longitudinally extending guiding shoulder faces of the outer joint part which radially inwardly adjoin the tracks. The axes of the surfaces, in the shape of a circular cylindrical portion, of the tracks in each recess substantially coincide with the center of the roller element surface, in the shape of a spherical portion, with the track radius optionally being slightly greater than the radius of the roller surface. The cooperation of the surfaces thus does not generate any resistance against tilting around all axes, which means that the additional means for guiding and supporting the roller assembly are essential to prevent it from tilting.

Relevant joints are shown in EP 0 426 186 A1. In these joints, the radially inner end of the roller carrier is provided with a collar which serves to Support the roller assembly relative to the outer joint part. In EP 0 298 249 B1, the radially outer end of the roller carrier may also be provided with a collar which serves to support the roller assembly relative to the outer joint part. This type of support ensures the substantially rolling movement of the roller element relative to the tracks in the outer joint part, with the axis of the roller element always being parallel thereto. However, if viewed in a section extending perpendicularly to the axis of the outer joint part, a slight inclination of the roller axis relative to the arm axis is said to be possible under torque loading in order to ensure that the track surface is loaded uniformly by the roller element. On the other hand, any tilting of the roller axis relative to the axis of the outer joint part and thus relative to the tracks, if viewed in a longitudinal section through the joint, is to be avoided by the shoulder to maintain, at all times, a purely rolling movement when the joint rotates in the articulated condition.

A typical feature of the joint of the above-mentioned type consists in that the roller carrier should not be held on the tripod arm so as to be able to rotate because the relative movement between the roller element and arm is to take place in the bearing, between the roller element and roller carrier provided for that purpose. However, as a result of the contact between the shoulder at the roller carrier and the supporting counter-shoulder at the tracks, the roller carrier is forced to carry out a rotational movement which leads to sliding friction either between the arm and bore of the roller carrier or between the roller carrier and the outer joint part in the region of the supporting annular shoulder.

DE 28 31 044 A1, proposes joints of the above-mentioned type where only the roller element is in contact with the tracks. A tilting movement of the roller element relative to the tracks can only be prevented by the roller elements including running faces which deviate from the spherical shape and which are either crowned or roof-shaped in section. Producing corresponding non-spherical surfaces at the roller elements and the respective rolling faces at the tracks constitutes a problem. In consequence, a uniform load application along the contact line between the roller element and track is difficult to achieve. Any tilting of the roller elements relative to the outer joint part, when the inner joint part is in an articulated position relative to the outer joint part, can only be prevented by a form-fitting contact between the roller elements and tracks which has the tendency of leading to the entire roller element tilting in the tracks and thus to a jamming effect and increased loads at the upper and lower annular edges of the roller elements.

DE 37 16 962 C2, proposes a tripod joint of a similar kind, where the bearing is arranged differently and thus, instead of a non-rotating bearing carrier, an inner roller is provided which rotates relative to the arm. The roller elements have the shape as described in the previous publication so that the problems in respect of roller guidance are the same. In this case, too, the roller elements are guided in the tracks as a result of a complete form-fitting contact between the two components in the cross-section which leads to jamming of the roller elements and thus increased edge loads when the inner joint part is articulated relative to the outer joint part.

DE 31 03 172 A1, illustrates similar joints where, as in the initially mentioned publication, the roller assembly is supported relative to the outer joint part via an enlarged radially inner collar at the roller carrier or via an intermediate ring between the roller element and the roller carrier. With the first mentioned embodiment, the disadvantages are the same as those mentioned above. The second mentioned embodiment leads to a sliding friction at the intermediate ring relative to the roller carrier or relative to the shoulder faces and the roller element.

SUMMARY OF THE INVENTION

It is an object of the present invention to provide a tripod joint of the initially mentioned type where the running faces of the roller elements are designed to be spherical, with the respective tracks being grooved so as to be circular-cylindrical and provided with suitable improved supporting means to prevent any tilting of the roller assembly relative to the outer joint part. The objective is achieved by the roller elements, on their respective sides facing radially inwardly of the outer joint part, each including an annular shoulder which adjoins the running face in the shape of a spherical portion and which, entirely on its own, provides the supporting contact of the respective roller assembly with respect to the guiding shoulder faces. A further contact preventing the roller assemblies from tilting, in a way known in itself, takes place between radially outwardly lying faces of the roller carrier and the end surfaces of the recesses.

On the one hand, the assembly as proposed retains the desired design of the surfaces of the roller elements and tracks, and on the other hand, the support which prevents the roller elements from tilting in the tracks is provided by a part rolling on the guiding shoulder faces of the outer joint part, i.e. the radially inwardly facing annular shoulder faces of the roller elements. The above applies to the side of the roller elements which is loaded under torque conditions and to the respective tracks. The non-rolling relative movement on the circumferentially opposed side of the roller elements and the opposed tracks in each recess in the outer joint part is of no significance because, due to the play provided, the roller is largely lifted off the track.

In order to prevent roller jamming when a slight relative movement occurs between the roller axis and arm axis, if viewed in section, an advantageous embodiment includes a chamfer between the spherical running track surface of the roller elements and the annular shoulder. The opening angle of the preferably conical chamfer amounts to approximately 50°, with half the opening angle, with reference to the roller axis, amounting to approximately 25°. The chamfer may have a shape other than the conical shape and constitute a recess of a different shape.

According to a first preferred embodiment, the annular shoulder faces at the roller elements are conical faces in the case of which half the opening angle approximately corresponds to the angle of inclination of the guiding shoulder faces relative to the axis A of the roller assembly, as viewed in section. The conical faces are easy to produce. The cone opening angle of the annular shoulder face preferably amounts to a total of 90°, with reference to the roller axis, half the opening angle amounts to approximately 45°. The cone opening angle of the annular shoulder face should preferably be approximately 2° smaller than the angle between the guiding shoulder faces of the outer joint part, if viewed in section. In this way it is ensured that it is only when the roller assembly is slightly tilted, which happens when the joint is torque-loaded, that contact occurs between the annular shoulder face and the respective guiding shoulder face, such contact being linear in cross-section and subjected to a uniform load.

According to a second advantageous embodiment, the annular shoulder faces are barrel shaped or spherically curved, the radius of curvature, in section, is greater than that of the running face. In section, the centers of curvature may be positioned on a perpendicular line erected in the center of the respective guiding shoulder faces. This design ensures that even if the roller tilts slightly, no change in the contact conditions and especially no increase in edge loads need to be feared. The center of the barrel-shaped or spherical shoulder face may also be arranged in such a way that it is only when the roller tilts slightly that the central region of the annular shoulder face contacts, and rolls on, the guiding shoulder face.

As is known from the state of the art, a collar at the roller carrier may either be arranged on the radial inside of the recess or on the radial outside of the recess. This collar serves to axially secure the roller elements and optionally the needle or roller bearing members on the roller carrier. At the opposite end, the roller elements and optionally the needle or roller bearing members are secured relative to the roller carrier by conventional securing rings. In any case, the outer circumferential faces of the elements provided on the radial inside of the recess to ensure axial attachment, the collar or securing rings, have to be covered by a portion of the roller which is provided with the annular shoulder face.

In a design deviating from the above, the roller elements and optionally the needle or roller bearing members may also, on the inside and outside of the recess, be axially secured relative to the respective roller carriers by two securing rings each which, on their outer circumferential faces, are covered by the respective roller elements.

In a further advantageous embodiment, the roller elements with the annular shoulder faces and chamfered regions are designed to be symmetrical relative to the roller center plane so that assembly errors are excluded. In developing this idea further, it is also possible for the entire roller assembly to be symmetrical relative to a roller center plane.

From the following detailed description taken in conjunction with the accompanying drawings and subjoined claims, other objects and advantages of the present invention will become apparent to those skilled in the art.

BRIEF DESCRIPTION OF THE DRAWINGS

In the drawings listed below, roller assemblies in accordance with the invention are compared with those according to the state of the art.

DETAILED DESCRIPTION OF THE PREFERRED EMBODIMENT

Figure 1:
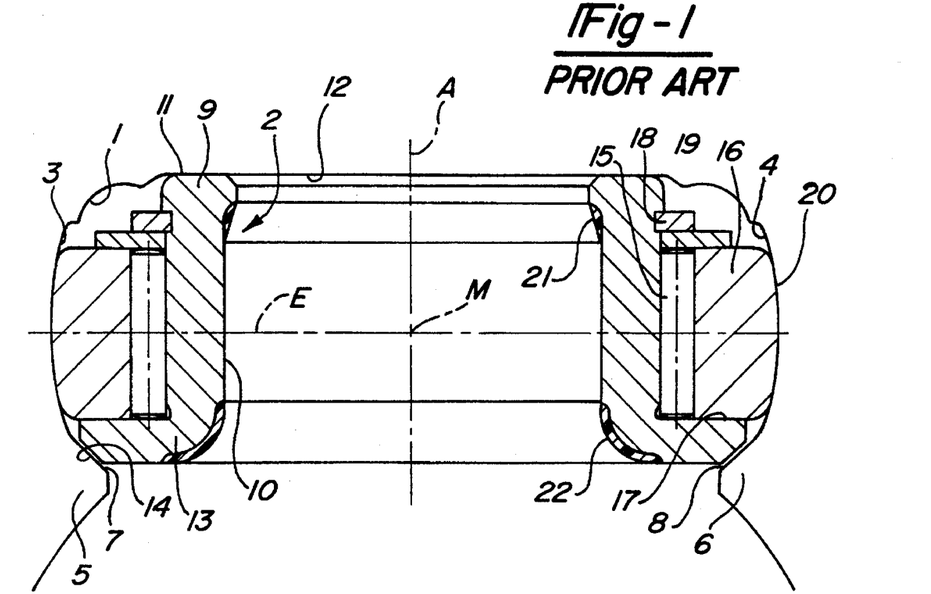
FIG. 1 is a cross sectional view of a roller assembly in a recess in a joint according to the state of the art.

FIG. 1 shows one of three uniformly circumferentially distributed recesses i provided in an outer joint part. The recess 1 holds a multi-component roller assembly 2 which, in turn, is held on one of three uniformly circumferentially distributed arms of an inner joint part (not illustrated). Dash-dotted lines indicate the axis A of the roller assembly and its center plane E. The longitudinal center plane of the joint intersects the axis A at right angles below the illustrated detail.

The recess 1 includes opposed tracks 3, 4, with radially inner necked regions 5, 6 forming shoulder faces 7, 8 adjoining the tracks. The roller assembly includes a roller carrier 9 with a cylindrical inner face 10 which may be engaged, so as to be longitudinally and angularly movable, for example, by a spherical head attached to the end of an arm of the inner joint part. The radial outside of the roller carrier 9 includes an end face 11 which cooperates with a planar base 12 in the recess 1. On its radial inside, the roller carrier includes an outwardly pointing collar 13 provided with a conical annular shoulder 14 which cooperates with the shoulder faces 7, 8. The roller carrier 9, via a needle bearing 15, rotatably supports a roller element 16 which is radially held on the roller carrier 9 between an annular face 17 at the collar 13 and securing rings 18, 19. The running face 20 of the roller element 16 is designed as a face of a spherical portion around the center M of the roller assembly. In the inner face 10 of the roller carrier 9, special annular faces 21, 22, capable of coming into contact with the spherical head and neck of the respective arm, are indicated by intersecting lines referring to material hardening in this region.

Figure 2:
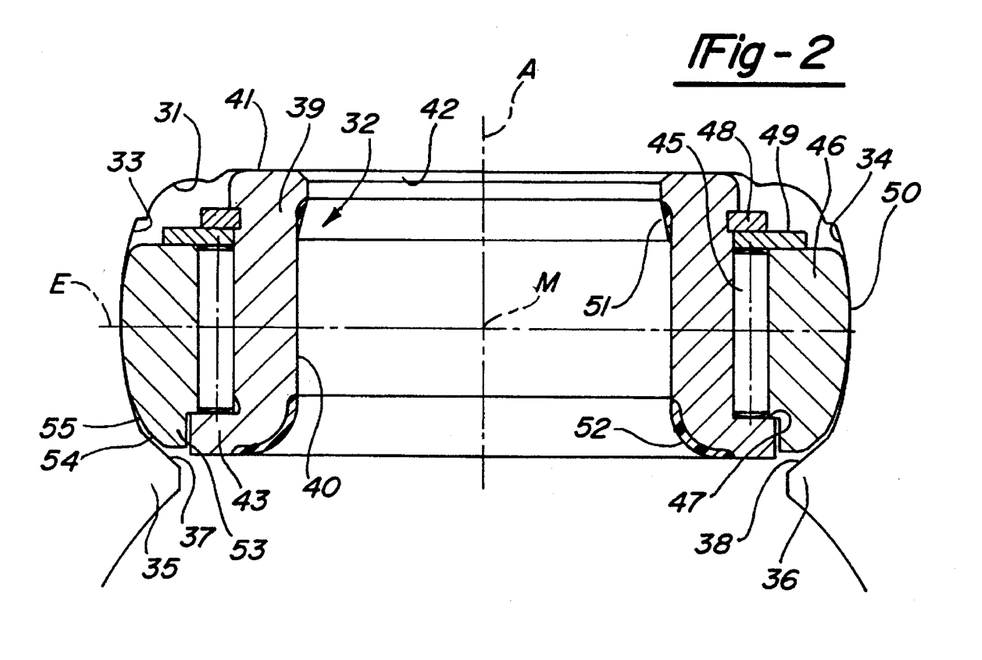
FIG. 2 is a cross sectional view of a roller assembly in a recess in accordance with the invention in a joint of the same design as illustrated in FIG. 1.

In FIG. 2, the reference numbers of any details corresponding to those of FIG. 1 have been increased by 30. Reference is made to the description to the extent that details correspond. In contrast to FIG. 1, the collar 43 includes a greatly reduced diameter which projects only slightly beyond the inner diameter of the roller element 46 so that radial attachment of the roller element 36 relative to the roller carrier 39 is ensured between an annular face 47 and securing rings 48, 49. The roller element 36 is provided with a radially inwardly pointing projection 53 provided with a conical annular shoulder 54 extending at an angle of approximately 45° relative to the axis A of the roller assembly. The transition between the running face 50, in the shape of a spherical portion, and the annular shoulder 54 is formed by a chamfered region 55 whose angle relative to the axis A of the roller assembly amounts to approximately 25°. The annular shoulder 54 cooperates with the shoulder faces 37, 38 at the necked regions 35, 36.

Figure 3:
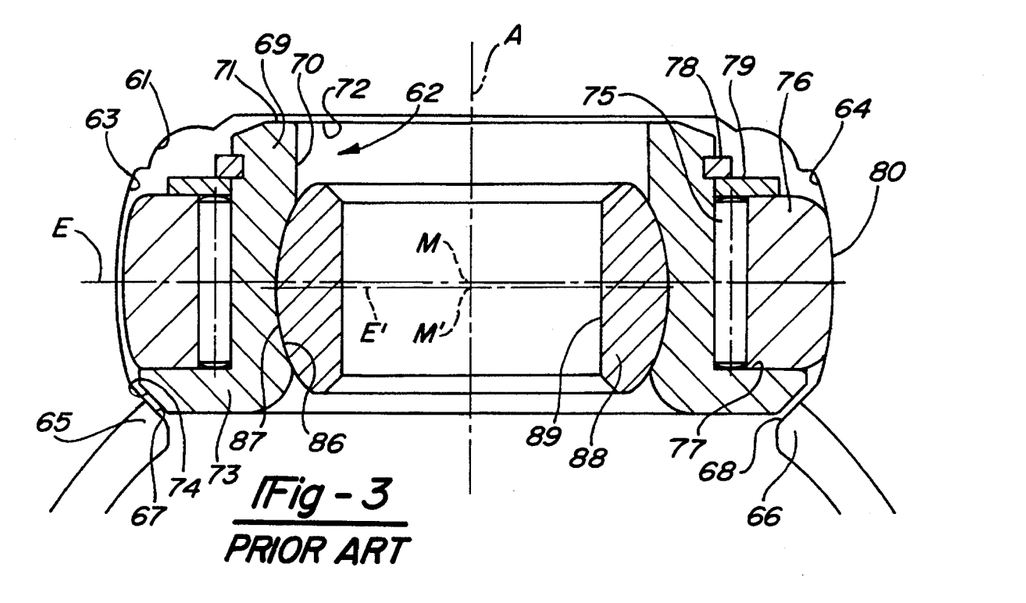
FIG. 3 is a cross sectional view of a roller assembly in a recess in a joint according to the state of the art.

FIG. 3 shows one of three uniformly circumferentially distributed recesses 61 provided in an outer joint part. The recess 61 holds a multi-component roller assembly 62 which, in turn, is held on one of three uniformly circumferentially distributed arms of an inner joint part (not illustrated). Dash-dotted lines indicate the axis A of the roller assembly and its center plane E. The longitudinal center plane of the joint intersects the axis A at right angles below the illustrated detail. The recess 61 includes opposed tracks, 63, 64, with radially inner necked regions 65, 66 which form shoulder faces 67, 68 adjoining the tracks.

The roller assembly includes a roller carrier 69 with an inner aperture 70. Part of the inner aperture 70 of the roller carrier 69 is provided with an inner spherical face 86 which cooperates with an outer spherical face 87 of the inner ring 88. The inner ring 88 includes a cylindrical bore 89 which enables a cylindrical tripod arm to slide in an axially movable way while an angular movement is permitted as a result of the pivot movement of the inner ring 88 in the roller carrier 69. On the radial outside of the roller carrier 69 an end face 71 is provided which cooperates with a planar base 72 in the recess 61 on its radial inside, the roller carrier is provided with an outwardly pointing collar 73 which includes a conical annular shoulder 74 which cooperates with the shoulder faces 67, 68.

The roller carrier 69, via a needle bearing 75, rotatably supports a roller element 76 which is radially held on the roller carrier 69 between an annular face 77 at the collar 73 and securing rings 78, 79. The running face 80 of the roller elements 76 is designed as a face of a spherical portion around the center M of the roller assembly.

Figure 4:
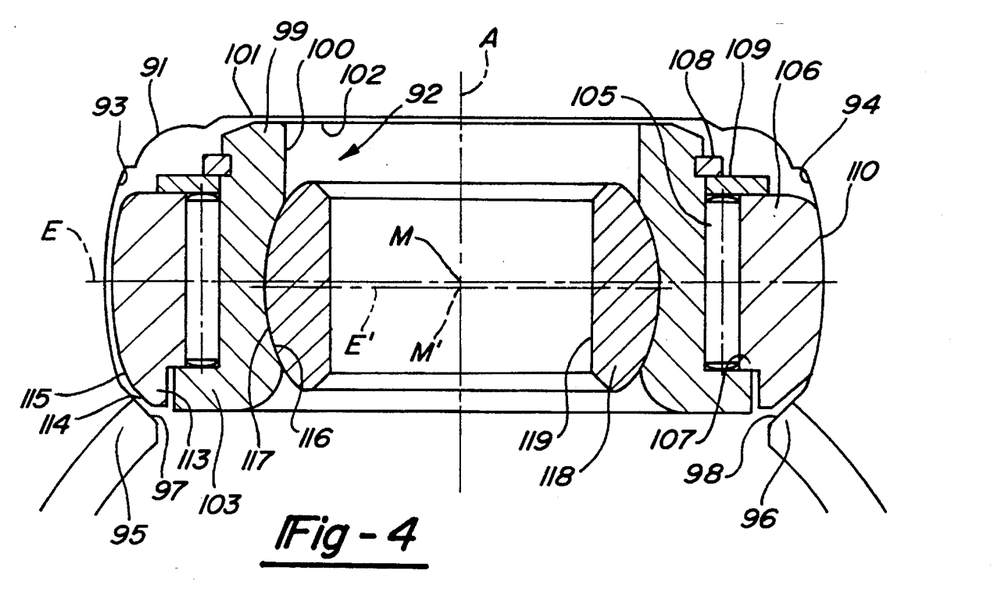
FIG. 4 in the form of a detail, shows a roller assembly in a recess in accordance with the invention in a joint of the design as illustrated in FIG. 3.

In FIG. 4, the reference numbers of any details corresponding to those of FIG. 3 have been increased by 30. Reference is made to the description to the extent that details correspond. In contrast to FIG. 3, the collar 73 includes a greatly reduced diameter which projects only slightly beyond the inner diameter of the roller element 106 so that radial attachment of the roller element 106 relative to the roller carrier 99 is ensured between an annular face 107 and securing rings 108, 109. The roller element 106 is provided with a radially inwardly pointing projection 113 provided with a conical annular shoulder 114 which extends at an angle of approximately 45° relative to the axis A of the roller assembly. The transition between the running face 110, in the shape of a spherical portion, and the annular shoulder 114 is formed by a chamfered region 115 whose angle relative to the axis A of the roller assembly amounts to approximately 25°. The annular shoulder 114 cooperates with the shoulder faces 97, 98 at the necked regions 95, 96.

In FIGS. 3 and 4, a second dash-dotted center plane E' of the inner roller 118 defines a second center M' which forms the center of the spherical face 117 of the inner roller 118. These offset planes are advantageous for generating a defined tilting moment at the roller assemblies when the joint is torque-loaded, which tilting moment leads to them being supported on the shoulder faces.

Figure 5:
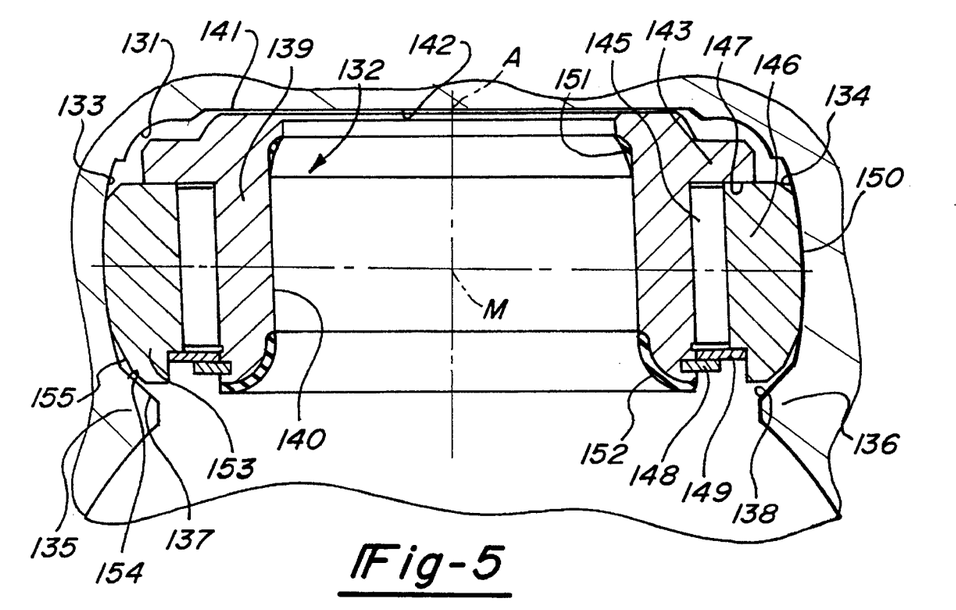
FIG. 5 is a cross sectional view of a roller assembly in accordance with the invention in a joint of the same design as illustrated in FIG. 2, with a modified roller carrier.

In FIG. 5, the reference numbers of any details corresponding to those of FIG. 2 have been increased by 100. In contrast to FIG. 2, the collar 143 is arranged on the radial outside in the recess at the roller carrier 139 where it assumes the function of the securing rings according to FIG. 2. The securing rings 148, 149 are positioned on the radial inside in the recess at the roller carrier where they assume the function of the collar according to FIG. 2.

Figure 6:
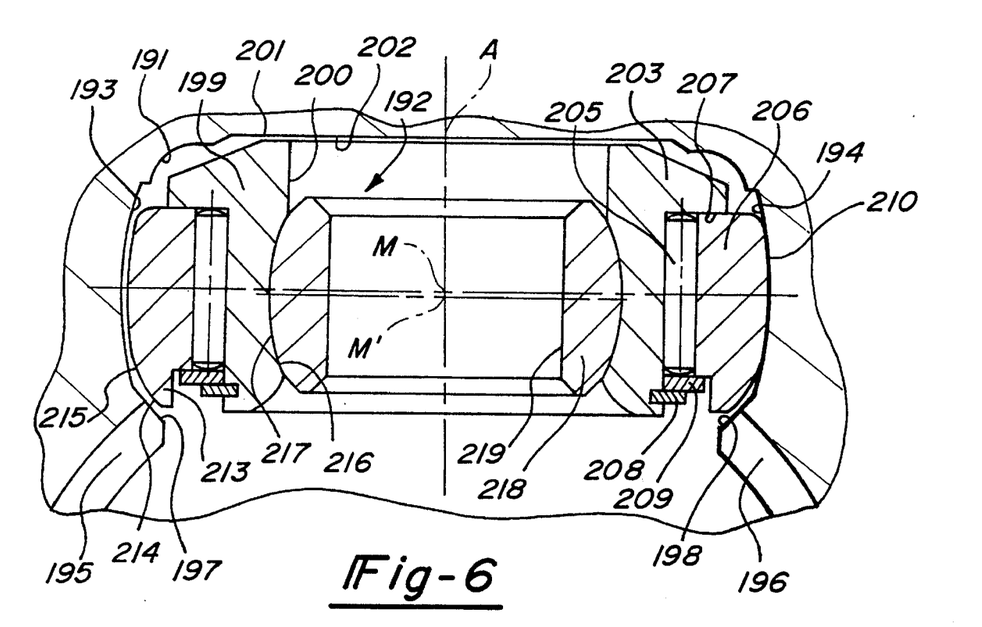
FIG. 6 is a cross sectional view of a roller assembly in accordance with the invention in a joint of the same design as illustrated in FIG. 4, with a modified roller carrier.

In FIG. 6, the reference numbers of any details corresponding to those of FIG. 4 have been increased by 100. In contrast to FIG. 4, the collar 203 is arranged on the radial outside in the recess at the roller carrier 199 where it assumes the function of the securing rings according to FIG. 4. The securing rings 208, 209 are positioned on the radial inside in the recess at the roller carrier where they assume the function of the collar according to FIG. 4.

Figure 7:
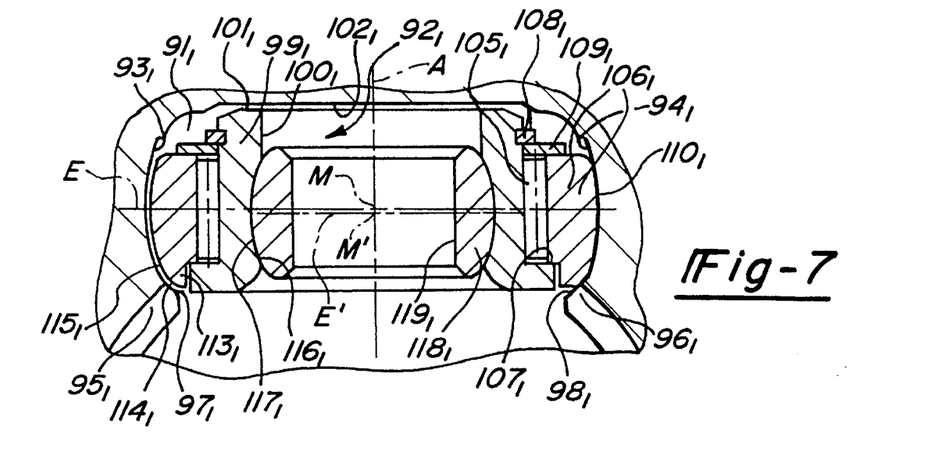
FIG. 7 is a cross sectional view of a roller assembly in accordance with the invention similar to that illustrated in FIG. 4, with a spherical annular shoulder face.

In FIG. 7, the reference numbers of any details corresponding to those of FIG. 4 have been allocated the index 1. The details are identical with the exception of the fact that the annular shoulder face $114_1$ is not designed as a conical face but as a spherical face.

Figure 8:
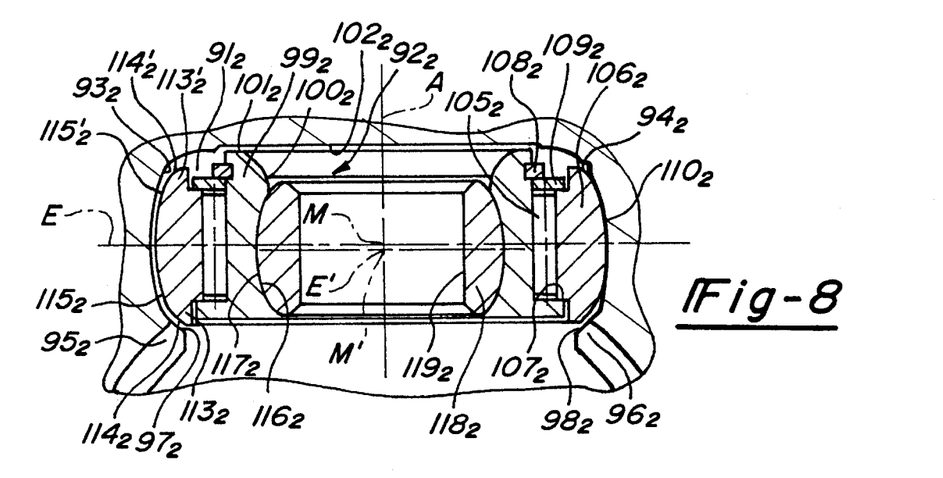
FIG. 8 is a cross sectional view of a roller assembly in accordance with the invention similar to that illustrated in FIG. 4, with a roller member designed to be symmetrical relative to a roller center plane.

In FIG. 8, any details corresponding to those in FIG. 7 have been allocated the same reference numbers but also the index 2. The details are identical with the exception that the roller member $106_2$ is symmetric relative to its roller center plane E and, at its outer projection $113_2'$, it includes an outer annular shoulder face $114_2'$ and a corresponding chamfer $115_2'$.

Figure 9:
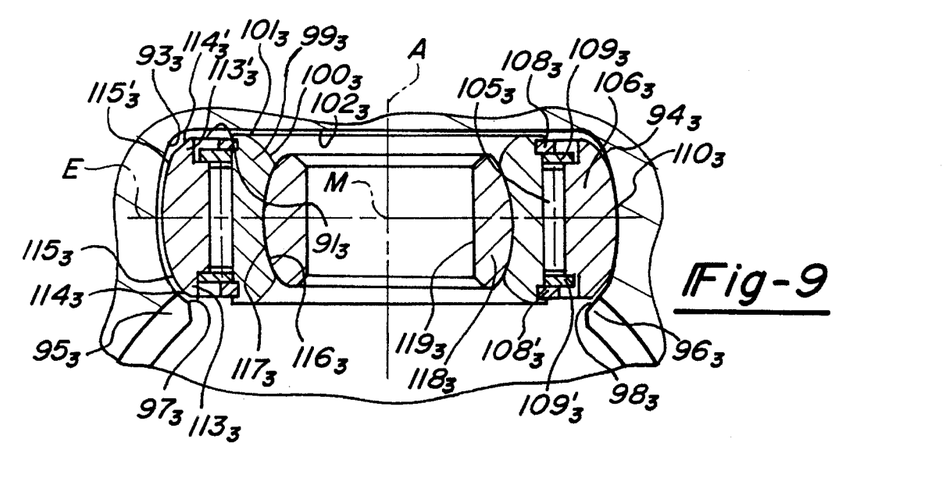
FIG. 9 is a cross sectional view of a roller assembly in accordance with the invention similar to that illustrated in FIG. 4, with a symmetrical roller assembly and double securing rings.

In FIG. 9, any details corresponding to those in FIG. 7 have been allocated the same reference numbers but also the index 3. The details are identical with the exception that the entire roller assembly is symmetric relative to the roller center plane E and it includes inner securing rings $108_3'$, $109_3'$ instead of the inner annular shoulder.

In FIGS. 7 to 9, the inside of the roller carrier may also be provided with a cylindrical face according to FIGS. 1, 2 and 5. In particular, this is more advantageous in the case of FIG. 9 where the entire roller assembly is to be symmetric.

Figure 10:
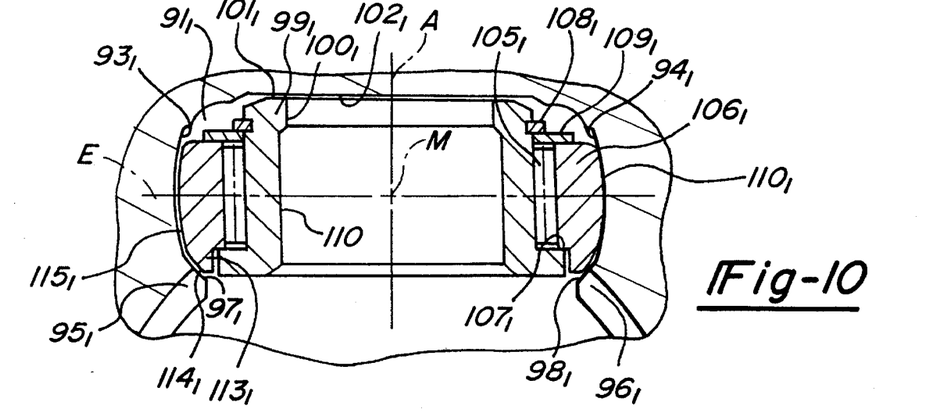
FIGS. 10, 11 and 12 are the same as FIGS. 7, 8 and 9 with the removal of the inner roller.
Figure 11:
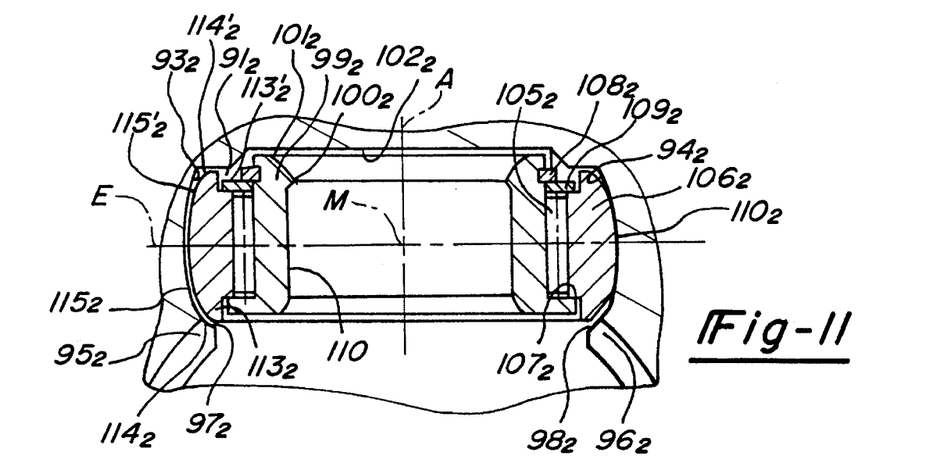
Figure 12:
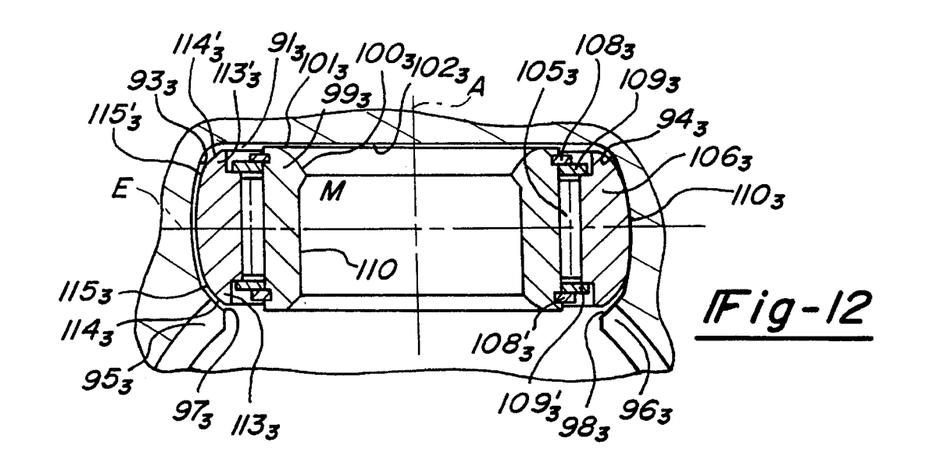

FIGS. 10 through 12 are the same as those of FIGS. 7 through 9 and include the same reference numerals, however, the roller assembly corresponds to the roller assembly type like that of FIG. 5.

While the above detailed description describes the preferred embodiment of the present invention, the invention is susceptible to modification, variation, and alteration without deviating from the scope and fair meaning of the subjoined claims.

We claim:

1. A constant velocity universal joint comprising:

an outer joint part including three axially extending, circumferentially distributed longitudinal recesses with circumferentially opposed tracks spanned by a recess base and said outer joint part defining a first axis, said tracks having surfaces which are grooved so as to have the shape of having a common longitudinal axis circular cylindrical portion and longitudinally extending guiding shoulder faces formed on said outer joint part, said shoulder faces adjacent said tracks and extending radially inwardly from said tracks;

an inner joint part including three radial circumferentially distributed arms each engaging one of the longitudinal recesses and said inner joint part defining a second axis;

roller assemblies carried on said inner joint part and having roller carriers and roller elements, said roller carriers and roller elements, each having a common radial axis, said roller elements having running faces in the shape of a true spherical portion having a single center and being axially guided so as to roll on the tracks in the longitudinal recesses of the outer joint part, the roller carriers being guided on the arms so as to be pivotable and longitudinally movable relative to a respective arm axis and the roller elements being coaxially supported on the roller carriers so as to be rotatable, and said roller assemblies being supported on said recess bases and only said roller elements being supported on said longitudinally extending guiding shoulder faces to prevent said roller assemblies from tilting relative to the outer joint part, said guiding shoulder faces being provided at an angle of inclination relative to said common radial axes of said roller assemblies; and the roller elements each including an annular shoulder face adjoining the roller element spherical running face and forming a cone with half the opening angle approximately corresponding to said angle of inclination, said annular shoulder face providing supporting contact between the respective roller assembly and the guiding shoulder faces.

2. A constant velocity universal joint according to claim 1, wherein half the cone opening angle of the annular shoulder faces amounts to approximately 45° with reference to the longitudinal roller axis and, especially, is approximately 1° smaller than the angle of inclination of the guiding shoulder faces relative to the axis of the roller assembly.

3. A constant velocity universal joint according to claim 1, wherein the annular shoulder faces are spherically curved, the radius of curvature, in section, being greater than that of the running face.

4. A constant velocity universal joint according to claim 1, wherein the roller carriers include an outwardly extending collar with reference to said common radial axis, said collar serves as an axial stop for the roller elements and which, at its outer circumferential face, is at least partially covered by the respective roller element, and the roller elements are axially secured relative to the roller carrier by securing rings.

5. A constant velocity universal joint according to claim 1, wherein the roller carriers, on their radial outside in the recesses, include a collar which, with reference to the axis of the roller assembly, projects outwardly and which serves as an axial stop for the roller elements and optionally for rolling members, and the roller elements and optionally the rolling members are axially secured relative to the roller carrier on the radial inside in the recesses by securing rings which, on their outer circumferential faces, are at least partially covered by the respective roller element.

6. A constant velocity universal joint according to claim 5, wherein the roller elements and optionally the rolling members, on both sides, are axially secured relative to the roller carrier by securing rings which, on their outer circumferential faces, are at least partially covered by the respective roller element.

7. A constant velocity universal joint according to claim 1, wherein the roller assemblies are designed to be symmetrical relative to a roller center plane.

8. A constant velocity universal joint according to claim 1, wherein the roller carders include an outwardly extending collar with reference to the common radial axis, said collar serves as an axial stop for the roller elements and which, at said collar's outer circumferential face, is at least partially covered by the respective roller element, and the roller elements are axially secured relative to the roller carrier by securing rings.

9. A constant velocity universal joint according to claim 1, wherein between the running face in the shape of a spherical portion and the annular shoulder face a chamfered region is provided on the roller elements.

10. A constant velocity universal joint according to claim 9, wherein the chamfered region is designed as a conical face where half the opening angle amounts to approximately 25° relative to the longitudinal roller axis.

11. A constant velocity universal joint according to claim 9, wherein the roller elements with the annular shoulder faces and the chamfered regions are designed to be symmetrical relative to a roller center plane.

* * * * *

UNITED STATES PATENT AND TRADEMARK OFFICE
CERTIFICATE OF CORRECTION

PATENT NO. : 5,507,693
DATED : April 16, 1996
INVENTOR(S) : Peter Schwarzler, Volker Bergmann, Dieter Burghardt
Norbert Hofmann, Michael Ricks, Hans-Heinrich Welschof It is certified that error appears in the above-indentified patent and that said Letters Patent is hereby corrected as shown below:

Column 1, line 40, "Support" should be --support--

Column 4, line 53, "i" should be --1--

Column 7, lines 11-12, Claim 1, delete "having a common longitudinal axis circular cylindrical portion" and substitute therefor --circular cylindrical portions having a common longitudinal axis--

Column 7, line 21, Claim 1, delete ", each"

Column 8, line 31, Claim 8, "carders" should be --carriers--

Signed and Sealed this

Nineteenth Day of November, 1996

Attest:

BRUCE LEHMAN

Attesting Officer  Commissioner of Patents and Trademarks